United States Patent [19]

Celette

[11] Patent Number: 4,519,236

[45] Date of Patent: May 28, 1985

[54] CLAMPING DEVICE TO BE MOUNTED ON A FRAME OR BENCH JIG FOR CHECKING ANY DEFORMATIONS OF A VEHICLE BODY

[75] Inventor: Germain Celette, Vienne, France

[73] Assignee: Celette, S.A., Vienne, France

[21] Appl. No.: 649,163

[22] Filed: Sep. 10, 1984

Related U.S. Application Data

[63] Continuation of Ser. No. 404,920, Aug. 3, 1982, abandoned.

[30] Foreign Application Priority Data

Aug. 13, 1981 [FR] France .................. 81 15672

[51] Int. Cl.³ .............................................. B21D 1/12
[52] U.S. Cl. .................................. 72/457; 72/705; 269/60; 248/124; 248/354.3; 403/201
[58] Field of Search ................. 72/293, 390, 705, 704, 72/381, 382, 305, 386, 481, 482, 457; 269/45, 60, 74, 296, 307; 248/124, 125, 287, 354 S; 403/201, 156; 411/136, 147, 148, 150, 160

[56] References Cited

U.S. PATENT DOCUMENTS

| 278,094 | 5/1883 | Church | 269/307 |
|---|---|---|---|
| 523,284 | 7/1894 | Johnston | 403/256 |
| 837,267 | 11/1906 | Goodwin | 72/390 |
| 1,083,471 | 1/1914 | Walton et al. | 411/136 |
| 1,879,979 | 9/1932 | Countryman | 72/705 |
| 2,028,354 | 1/1936 | Roe | 72/481 |
| 2,219,191 | 10/1940 | Merrill et al. | 72/705 |
| 2,232,686 | 2/1941 | Becker | 72/390 |
| 2,340,587 | 2/1944 | Graham | 72/705 |
| 2,493,620 | 1/1950 | Cusano | 72/390 |
| 2,563,527 | 8/1951 | Gingrich et al. | 72/705 |
| 2,684,222 | 7/1954 | Miller | 248/405 |
| 3,172,634 | 3/1965 | Squire | 248/354 S |
| 3,425,473 | 2/1969 | Knowlton | 411/147 |
| 3,826,459 | 7/1974 | Warren | 248/354 S |
| 3,900,179 | 8/1975 | Mocny et al. | 248/287 |
| 4,023,394 | 5/1977 | Borup | 72/705 |
| 4,483,173 | 11/1984 | Hansen | 72/458 |

FOREIGN PATENT DOCUMENTS

| 552071 | 11/1956 | Belgium | 269/60 |
|---|---|---|---|
| 2745807 | 4/1979 | Fed. Rep. of Germany | 72/705 |
| 2423748 | 11/1979 | France | 72/705 |
| WO83/03373 | 10/1983 | PCT Int'l Appl. | 72/705 |

*Primary Examiner*—Lowell A. Larson
*Attorney, Agent, or Firm*—August E. Roehrig, Jr.

[57] ABSTRACT

The clamping device comprises a vertical screw for supporting a body-clamping jaw unit. The screw extends through a horizontal slide attached to the side of the checking frame or bench jig and is supported on the slide by slidably mounted bearing-blocks and by clamping nuts. Vertical and horizontal millimeter scales are attached respectively to the screw and to the slide and the body-clamping jaw unit is detachable. The position of the clamping unit can thus be adjusted with accuracy. Detachable mounting of the clamping unit permits rapid exchange for adapting the unit to different vehicle body shapes and designs.

8 Claims, 4 Drawing Figures

CLAMPING DEVICE TO BE MOUNTED ON A FRAME OR BENCH JIG FOR CHECKING ANY DEFORMATIONS OF A VEHICLE BODY

This is a continuation of application Ser. No. 404,920, filed Aug. 3, 1982, now abandoned.

This invention relates to a clamping device which is intended to be mounted on a frame or bench jig for checking any deformations of a vehicle body in order to maintain the body in a stationary position during body-checking and straightening operations.

As is already known, checking of deformations of a vehicle body or repair of a damaged body are carried out on a checking frame or so-called bench jig of the type described in French Pat. No. 78 11833 (publication No. 2 423 748) which is equipped with a set of jig brackets and clamping devices for fixing the vehicle in position while operations are in progress.

In one known form of construction, the clamping devices which serve to clamp the bottom body flanges are each constituted by a vertical bar which carries the clamp proper at the upper end, by a clamping collar within which the bar is capable of vertical displacement, and by a horizontal arm on which the collar is slidably mounted. The horizontal bar is mounted along the side member which is associated with the checking bench jig and the end of said bar is attached to said side member.

This system makes it possible to modify the position of the clamps in different directions, thus making it possible to place them in the correct positions in order to clamp the bottom body flanges. However, practical utilization of these clamping systems is relatively inconvenient and positioning of the clamp lacks accuracy in actual practice. Furthermore, it is found that the flexural resistance of said clamps in the various directions in which it is exerted is not always sufficient.

The object of the invention is to overcome these disadvantages by providing a clamping device which permits highly accurate adjustment in the vertical and horizontal directions and which is consequently endowed with considerably enhanced flexural resistance, the operation of said clamp being also simplified to the maximum extent.

The clamping device contemplated by the invention comprises a clamping-jaw unit secured to a vertical member which is adjustable for height and capable of horizontal displacement on a supporting arm.

According to the invention, the vertical member is a screw adapted to pass through bearing blocks and also through a horizontal slide which forms the supporting arm, the bearing-blocks being placed above and beneath said arm, with the result that the screw is adjustable both vertically and horizontally by displacement of said screw and of the bearing-blocks on the slide. Means are also provided for locking the clamp in the position chosen in the two horizontal and vertical directions.

Since the horizontal slide is preferably constituted by two high-strength bars which are relatively spaced at an interval providing a passage for the screw and the ends of which are rigidly connected together, there is accordingly obtained by means of this arrangement a device having appreciably increased flexural resistance in comparison with the clamping unit of the prior art mentioned earlier.

In a preferred embodiment, the bearing-blocks are clamped against the bars by means of nuts which are preferably provided with hollow lugs each adapted to receive a hand-operated locking-pin.

In order to adjust the vertical position of the screw and of the clamp carried by this latter, it is therefore only necessary to slacken the nuts and then to rotate the screw until it has reached the desired position.

As a complementary feature, it is only necessary to slide the bearing-blocks along the support bars in order to place the screw and the clamp in the horizontal direction and in the location which has been chosen. The clamp is locked in the position chosen, simply by tightening the nuts which lock the bearing-blocks against the slide bars.

According to another distinctive feature of the invention, millimeter scales are placed along the horizontal slide and on the screw in order to permit accurate position adjustment of the clamp along vertical and horizontal coordinate axes.

These and other features of the invention will be more apparent upon consideration of the following description and accompanying drawings, wherein.

Figure 4:
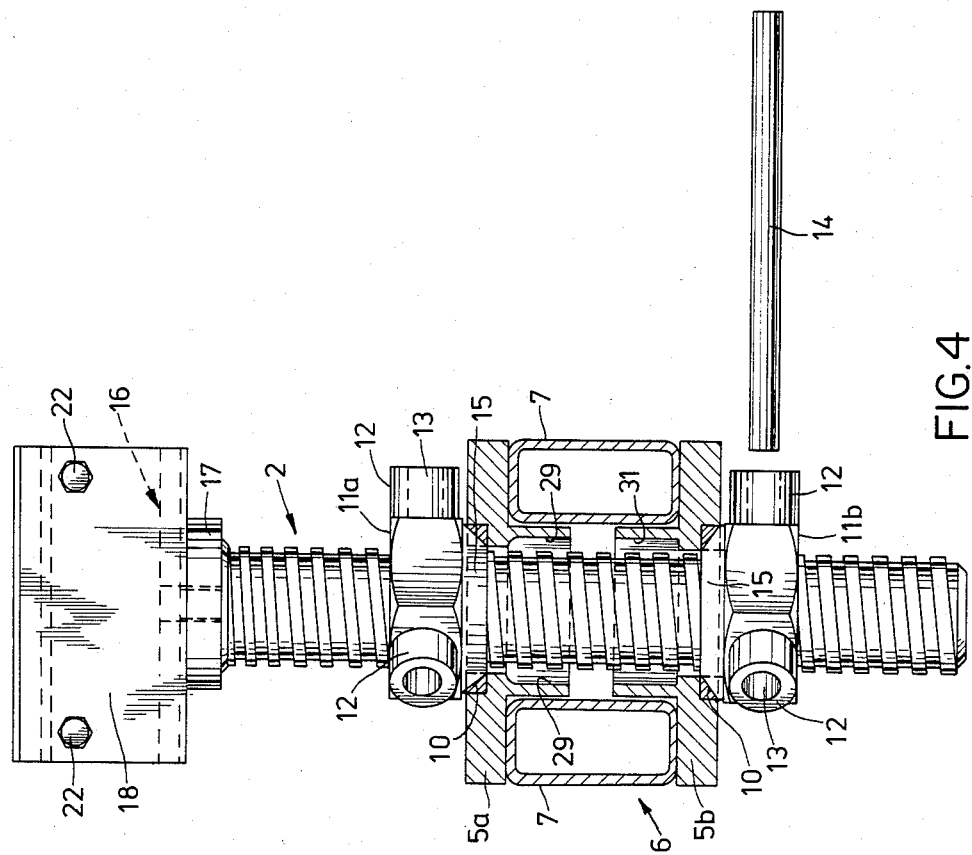
FIG. 4 is a view in transverse half-section and half-elevation showing the clamping device of FIGS. 1 to 3.
Figure 1:
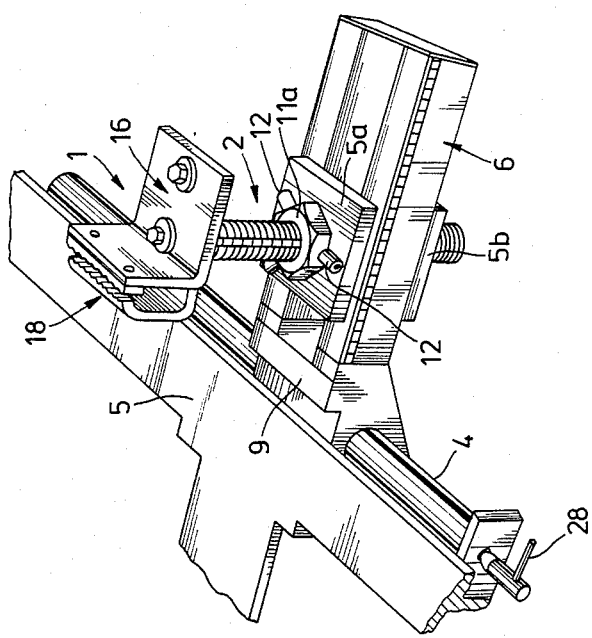
FIG. 1 is a view in perspective of a clamping device according to the invention.
Figure 2:
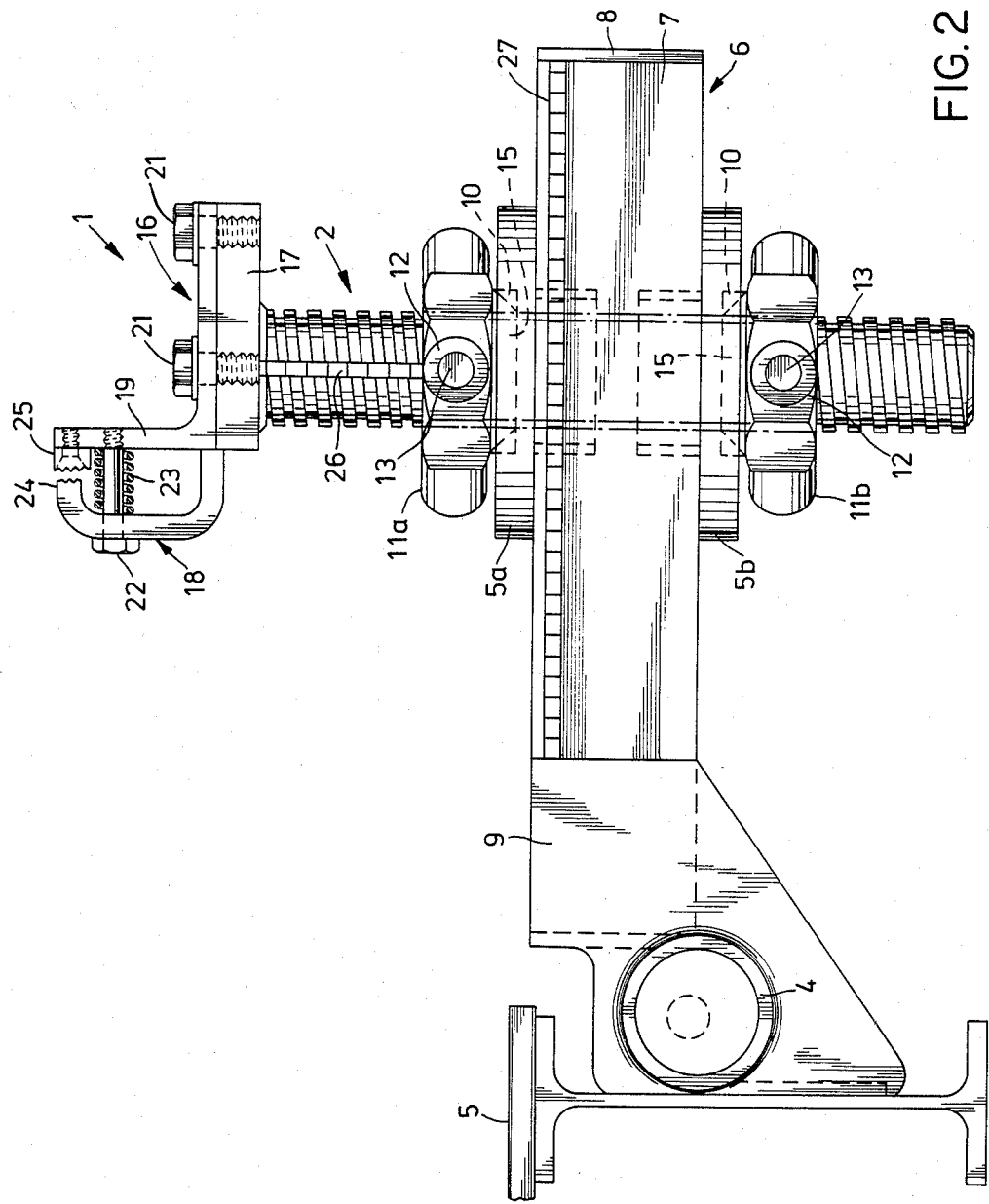
FIG. 2 is a view in longitudinal elevation to a larger scale in which the clamping device of FIG. 1 is mounted on the side of a frame for checking a vehicle body.

The clamping device shown in the drawings is intended to be mounted on a checking frame or bench jig of the type described in the patent cited earlier for checking any deformations of a vehicle body in order to maintain this latter in a stationarily fixed position during operations which involve checking and straightening of said vehicle body.

The clamping device comprises a clamp 1 which is secured to the upper end of a vertical member 2. Said member is adjustable for height and capable of horizontal displacement on a supporting arm 6, the end of which is attached to an eccentric 4 in a manner known per se. The ends of said eccentric are in turn supported by a longitudinal beam 5 of the checking bench.

According to the invention, the vertical member 2 is a screw of suitable length and diameter which extends through two bearing-blocks 5a, 5b and also through a horizontal slide 6 which forms the supporting arm. The bearing-block 5a has a rectangular contour in the example described and is mounted on the slide 6 whilst the bearing-block 5b is placed beneath this latter and coaxially with the screw 2 in the same manner as the bearing-block 5a.

The slide 6 is made up of two bars 7 having a rectangular cross-section and spaced at a sufficient distance from each other to permit the screw 2 to pass between them. Cross-members 8, 9 welded to the ends of said bars serve to provide a rigid connection between these latter. The bearing-blocks 5a, 5b are clamped against the bars 7 by means of nuts which are designated respectively by the references 11a, 11b and are coaxial with the screw 2.

The nuts 11a, 11b are each provided with lugs 12 (three in number in the example illustrated in the drawings), holes 13 being each drilled in said lugs for receiving a hand-operated locking-pin 14. The bearing-blocks 5a, 5b are provided with bronze rings 10 which are coaxial with the screw 2 and set in recesses of the bearing-blocks 5a, 5b, corresponding centering cones 15 of the nuts 11a, 11b being intended to bear on said rings.

The clamp 1 is placed at the upper end of the screw 2 and formed by the combination of an angle-iron member 16, the horizontal flange of which is fixed on a sole-plate 17 welded on the top end face of the screw 2, and of a movable jaw component 18 supported by the vertical flange 19 of the angle-iron member 16. Said member is fixed on the sole-plate 17 by means of two bolts 21 whilst the jaw component 18 is constituted by a U-section member traversed by horizontal bolts 22 screwed into the vertical flange 19, helical springs 23 being mounted coaxially with the bolts 22 between the flange 19 and the component 18. The end face 24 of the jaw component 18 is positioned opposite a heel block 25 which is rigidly fixed to the upper end of the vertical flange 19, the vehicle body (not shown in the drawings) being placed between the heel block 25 and the end face 24 of the jaw component 18.

The clamp 1 thus provided can consequently be detached simply by withdrawal of the bolts 21.

According to a particular feature, the invention makes provision for millimeter scales 26, 27, placed respectively along the upper portion of the screw 2 and along the horizontal slide 6. The vertical scale 26 serves to adjust the position of the clamp 1 by rotation of the screw 2 within the bearing-blocks 5a, 5b up to the precise coordinate which is required whilst the horizontal scale 27 serves to effect accurate positioning of the screw 2 and the clamp 1 in the horizontal direction.

The practical operation and technical advantages of the clamping device described in the foregoing will now become apparent from the following description.

The unit formed by the clamp 1, the screw 2, the bearing-blocks 5a, 5b and the locking nuts 11a, 11b is displaced by hand by sliding the bearing-blocks 5a, 5b along the horizontal bars 7 after slackening the nuts 11a, 11b. When the screw 2 is in the desired position as read on the millimeter rule 27, the screw 2 and the clamp 1 are displaced vertically to the desired coordinate which is read on the vertical rule 26. The operator than locks the assembly in position by means of the locking-pin 14 which he inserts within the lugs 12 of the nuts 11a, 11b.

Rotation of the nuts is assisted by the presence of the bronze rings 10 which form bearing faces. The operator then only needs to clamp the jaw component 18 in the corresponding location of the vehicle body by actuating the bolts 22.

As can readily be understood, height-adjustment of the clamp 1 can be carried out at the outset before adjusting said clamp in the horizontal direction.

It is worthy of note that, by releasing the upper nut 11a whilst the lower nut 11b remains locked in position, it is accordingly possible to perform a height adjustment of the screw 2 and of the clamp 1, thus ensuring accuracy of positioning of said clamp to within one millimeter.

Figure 3:
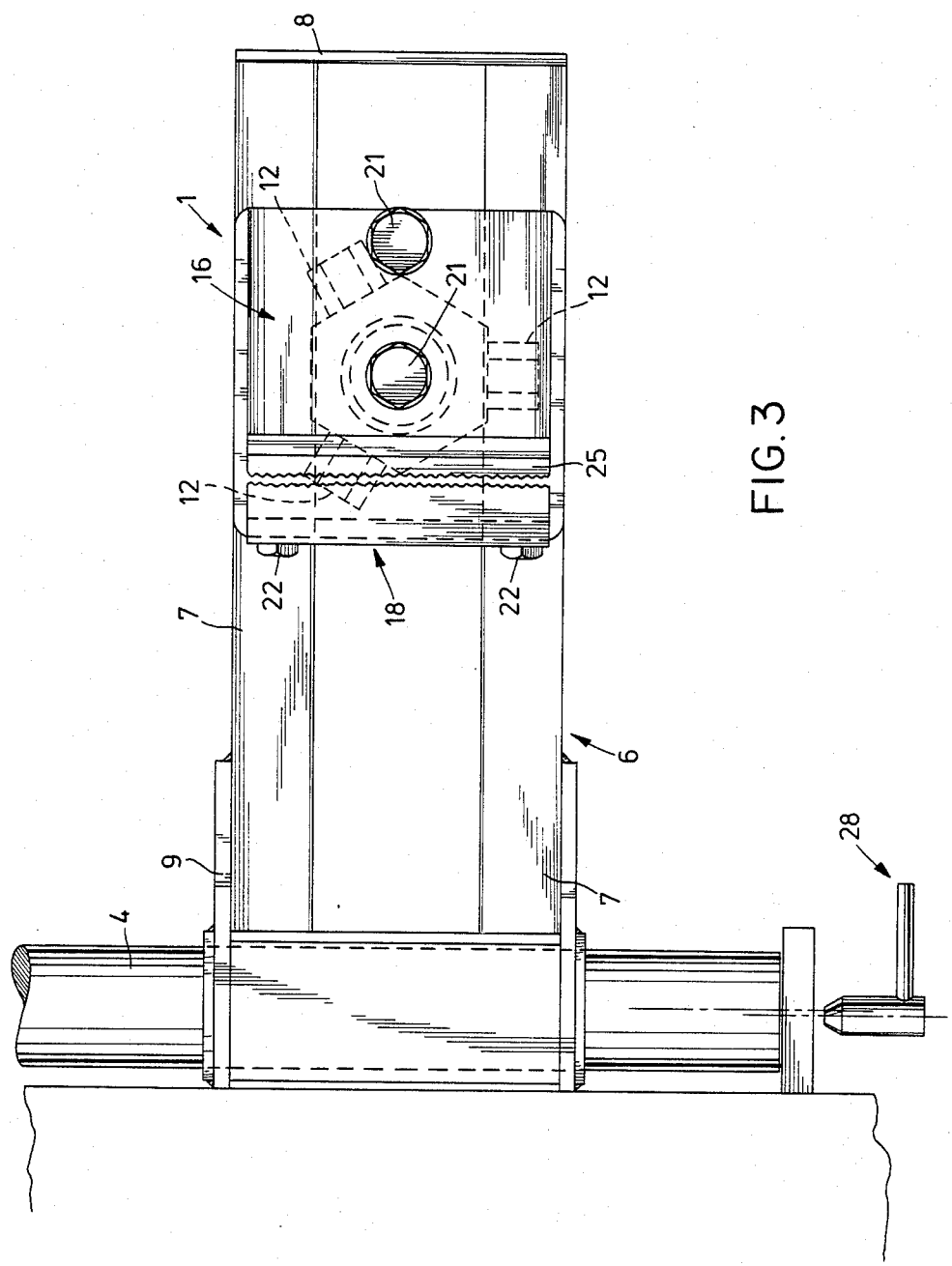
FIG. 3 is an overhead plan view to the same scale as FIG. 2 and showing the clamping device of FIGS. 1 and 2.

The locking-pin 14 can also be employed for locking the clamping device against the vehicle-body checking frame by means of the eccentric 4. Said eccentric can also be operated by means of a key 28 (as shown in FIG. 3) in a manner which is known per se.

It will be noted in FIG. 4 that each bearing-block 5a, 5b is provided with a respective annular flange 29, 31 which forms an internal projection within the space provided between the bars 7 and consequently carries out centering of the corresponding bearing-block 5a, 5b on the slide 6.

The presence of the graduated millimeter rules 26, 27 advantageously permits accurate position-adjustment of the clamp 1 along the two vertical and horizontal coordinate axes, which was not possible in constructional arrangements of the prior art.

Furthermore, the device is supporting the clamp 1 has flexural resistance in all directions, this resistance being considerably increased in comparison with the prior art mentioned earlier by virtue of the particular structure which is contemplated, especially by virtue of the slide 6 formed by the two highly rigid horizontal arms 7.

Finally, the detachable arrangement of the angle-iron member 16 of the clamp 1 on the sole-plate 17 offers the advantage of rapid replacement of one angle-iron member by another member which is more suitable for the vehicle body to be checked or straightened. This possibility of rapid replacement of one clamp by another is of considerable significance since it permits adaptation of the clamping device to any future change in shape of vehicle bodies.

The invention is not limited to the embodiment hereinabove described and can accordingly extend to a alternative forms of construction. From this it follows that the bearing-blocks 5a, 5b could have a circular contour. The same could apply to the locking nuts which would in such a case no longer be provided with lugs for introduction of a locking-pin. It will also be noted that the slide 6 can be modified in order to take into account any possible change in design of underbodies (unitized car-body design without any second sheet-metal stamping operation, and elimination of bottom body flanges).

What is claimed is:

1. A clamping device adapted to be mounted on a frame for clamping to the body of a vehicle supported on the frame, the clamping device comprising slide means adapted to be supported at one end from the frame upon which the body of the vehicle is supported for positioning a clamping device in a predetermined position relative to the vehicle body, said slide means including a pair of horizontally-extending parallelly-spaced slide members forming a slideway between the opposed faces thereof, a pair of bearing blocks one disposed on each upper and lower side of said slide members and positionable along said slideway, a vertical screw positioned within said slideway and being supported thereby by a pair of tightening nuts, said vertical screw having a clamping means supported from an upper end thereof for clamping to the body of a vehicle supported on the frame, said pair of tightening nuts being carried upon said vertical screw with one of said nuts positioned to bear against an upper portion of said bearing block disposed on the upper side of said slide members and the other of said nut positioned to bear against a lower portion of said bearing block disposed on the lower side of said slide members for moving said clamping means in a vertical direction.

2. The apparatus of claim 1, wherein said bearing blocks each have a flange portion disposed within said slideway for centering said bearing blocks within said slideway.

3. The apparatus of claim 2, wherein said flange portion is annular, encircling said vertical screw.

4. The apparatus of claim 1, wherein each of said tightening nuts includes a plurality of angularly spaced radial holes adapted to be engaged by means for effecting the rotation thereof.

5. The apparatus of claim 1, wherein each of said tightening nuts include a centering cone carried on the face thereof for engaging one of said bearing blocks for centering said nuts relative to said bearing blocks.

6. The apparatus of claim 5, wherein each of said bearing blocks carry a bearing ring disposed coaxially about said vertical screw in a position to engage one of said centering cones.

7. The apparatus of claim 1, and further including indicia bearing scales disposed along the slide means and along the vertical screw.

8. The apparatus of claim 1, wherein said clamping means comprises an L-shaped member detachably fixed on a sole-plate at the upper end of said vertical screw and a clamping-jaw having a first portion rigidly fixed to a vertical portion of said L-shaped member and a second portion movable relative to said first portion for clamping the body of the vehicle therebetween.

* * * * *